Oct. 12, 1971  L. S. GOLDMANN ETAL  3,611,795
CHIP TORQUE TESTING
Filed April 28, 1969  3 Sheets-Sheet 1
FIG. 1
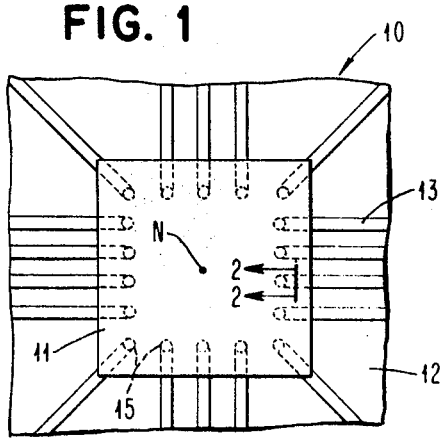
FIG. 2
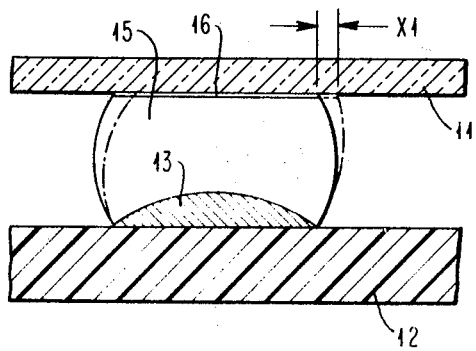
FIG. 3
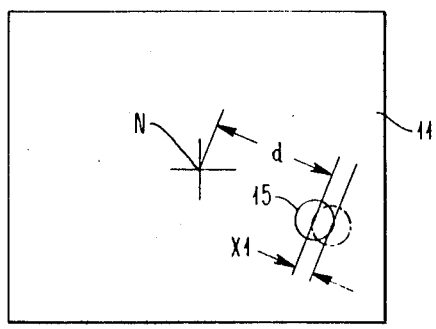
FIG. 4
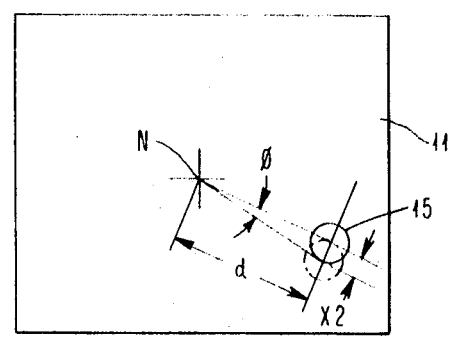
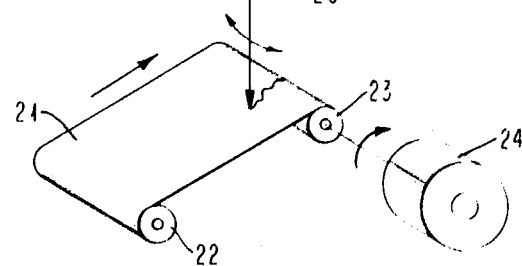
FIG. 6
FIG. 5
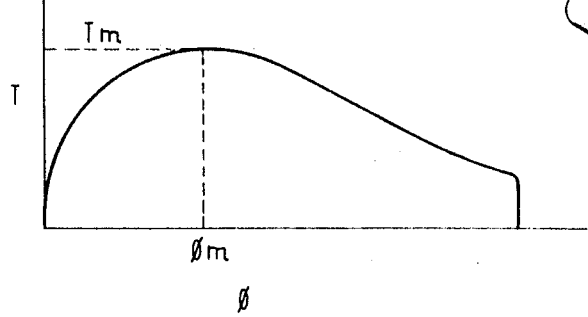
INVENTORS
LEWIS S. GOLDMANN
LEONARD E. LIANDER
BY Douglas R. McKechnie
ATTORNEY

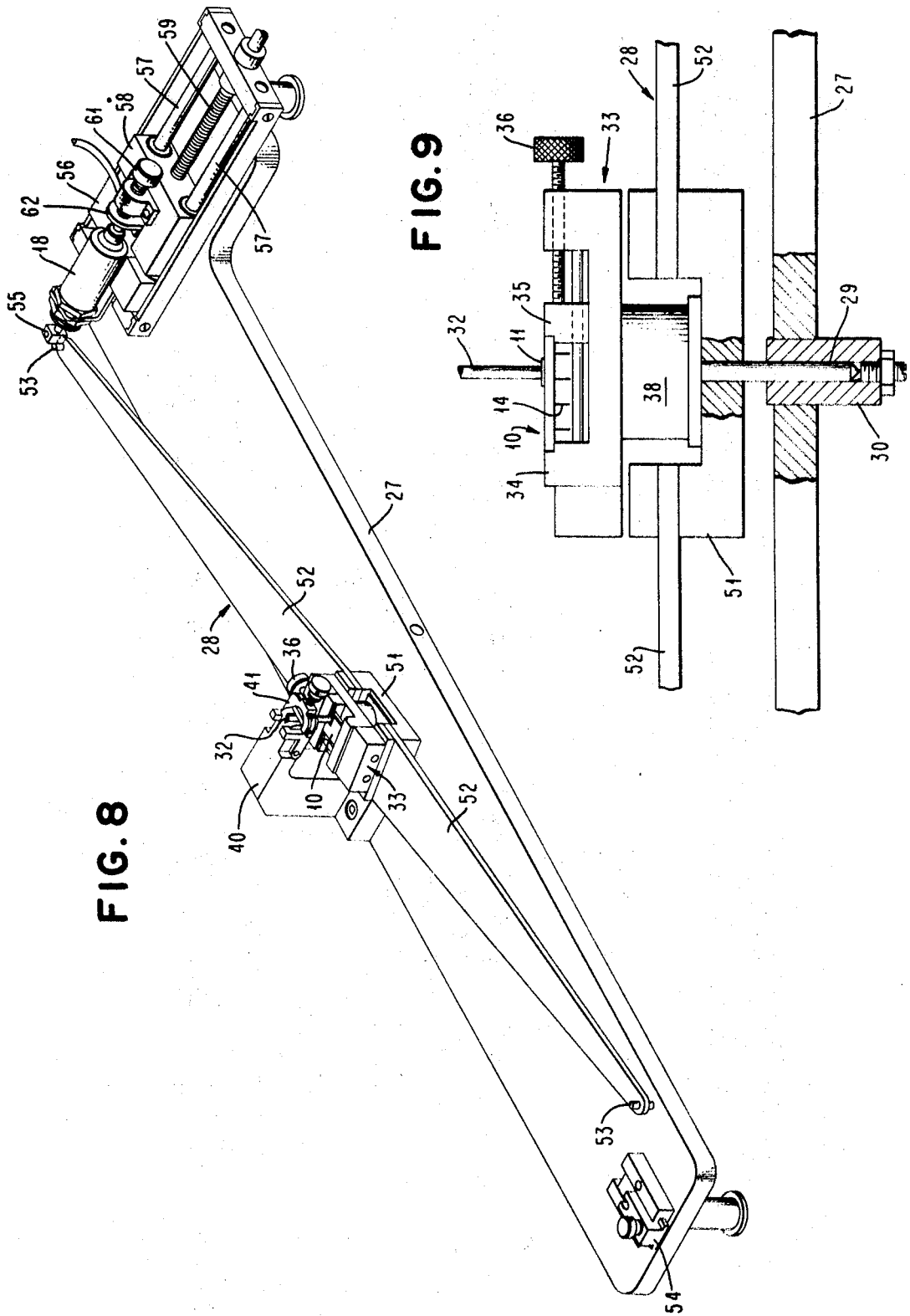

United States Patent Office 3,611,795
Patented Oct. 12, 1971

3,611,795
CHIP TORQUE TESTING
Lewis S. Goldmann, Ossining, and Leonard E. Liander,
Fishkill, N.Y., assignors to International Business
Machines Corporation, Armonk, N.Y.
Filed Apr. 28, 1969, Ser. No. 819,856
Int. Cl. G01n 3/22
U.S. Cl. 73—88
1 Claim

ABSTRACT OF THE DISCLOSURE

Method and apparatus are disclosed for torque testing a semiconductor device. The device is of the type in which a semiconductor wafer or chip is mounted on a substrate by a plurality of solder columns spaced around the chip. In use, such devices are subject to thermal cycling and hence are subjected to thermal stresses due to the different thermal expansion characteristics between the chip and substrate. The interaction of the thermal stresses exerted by the various columns produces a neutral point in the chip. The resultant thermal strains induced in the several joints are proportional to the distance from this neutral point. The testing method comprises rotating the chip relative to the substrate until it ruptures therefrom and, during such rotation, measuring the amount of torque as a function of the angle of twist or rotation. Apparatus carries out the method by holding the semiconductor device, rotating the chip relative to the base, measuring the torque and degree of twist, and plotting such characteristics to provide a record thereof.

BACKGROUND OF THE INVENTION

This invention relates to method and apparatus for torque testing a semiconductor device in which a chip is mounted on a substrate.

In use, semiconductor devices are subject to thermal cycling which induces stresses and strains in the various connecting joints. Inasmuch as the chip usually has a lower coefficient of thermal expansion than the substrate, which is generally of a ceramic material, the chip expands less than the substrate due to increases in temperature. Since the chip and substrate are relatively stiff, especially relative to the solder joints, the strains induced as a result of the thermal expansion are taken up by the solder joints. That is, the joints are displaced by amounts proportional to the respective distances from the neutral point of the thermal stresses. The thermal life of a semiconductor device is dependent primarily on the geometry of the connection and chip and on the mechanical and metallurgical properties of the joint materials. By controlling these factors, a suitable thermal life can be obtained. Thus, there is a need for determining such thermal life.

Quite obviously, the thermal life of a chip could be tested by subjecting the device to thermal fatigue testing, that is, alternately heating and cooling the chip over a period of time between different temperature swings. However, such testing is slow and requires a considerable period of time ranging from several weeks to months. Thus, there arose a need to develop a quicker test that was particularly suitable for production type testing.

In the prior art, two types of tests were made. In one test, the chip was pulled in tension from the substrate and the amount of force necessary to rupture the bond was measured. In the second test, the chip was pulled in shear from the substrate and the necessary force measured. While such tests are satisfactory from a standpoint of being quick, they nevertheless are disadvantageous in that they do not simulate the actual conditions which the semiconductor device is subject to in use.

SUMMARY OF THE INVENTION

The principal object of the invention is to provide a quick and accurate test of a semiconductor device that simulates the stresses of thermal cycling, but without the need to subject the device to such thermal cycling.

Another object of the invention is to test a chip connected to a substrate by a plurality of spaced solder joints by subjecting the joints to strains or displacements that are proportional to the distance from a point within the chip.

Briefly, in accordance with the invention, the above objects are obtained by the method of rotating the chip relative to the substrate about an axis that passes through the neutral point in the chip and measuring the torque as a function of the degree of twist. The degree of twist at which the maximum torque occurs is indicative of the expected thermal fatigue life of the device. The method is performed by apparatus in which the substrate and chip are connected to workholders that are mounted for rotation relative to each other. As such rotation occurs, the amount tof torque required to produce the rotation as well as the angle through which the rotation is taking place is measured. Such measurements may be fed to a plotter or recorder for automatically producing a record or graph thereof.

The foregoing and other objects, features and advantages of the invention will be apparent from the following more particular description of the preferred embodiments of the invention, as illustrated in the accompanying drawings.

FIG. 1 is a top plan view of a part of a semiconductor device;

FIG. 2 is an enlarged sectional view taken along lines 2—2 of FIG. 1;

FIG. 3 is a schematic diagram illustrating the effect of a thermal displacement;

FIG. 4 is a diagram similar to FIG. 3 showing the effect of a torsional displacement;

FIG. 5 is an exemplary graph illustrating the relationship between torque and the amount of twist applied to a chip;

FIG. 6 is a schematic diagram showing the system for producing the graph;

FIG. 8 is an other perspective view, with parts removed, illustrating the apparatus of FIG. 7 in a different condition; and FIG. 9 is an enlarged plan view, partly in section and with portions removed, of a portion of the apparatus shown in FIG. 8.

Figure 7:
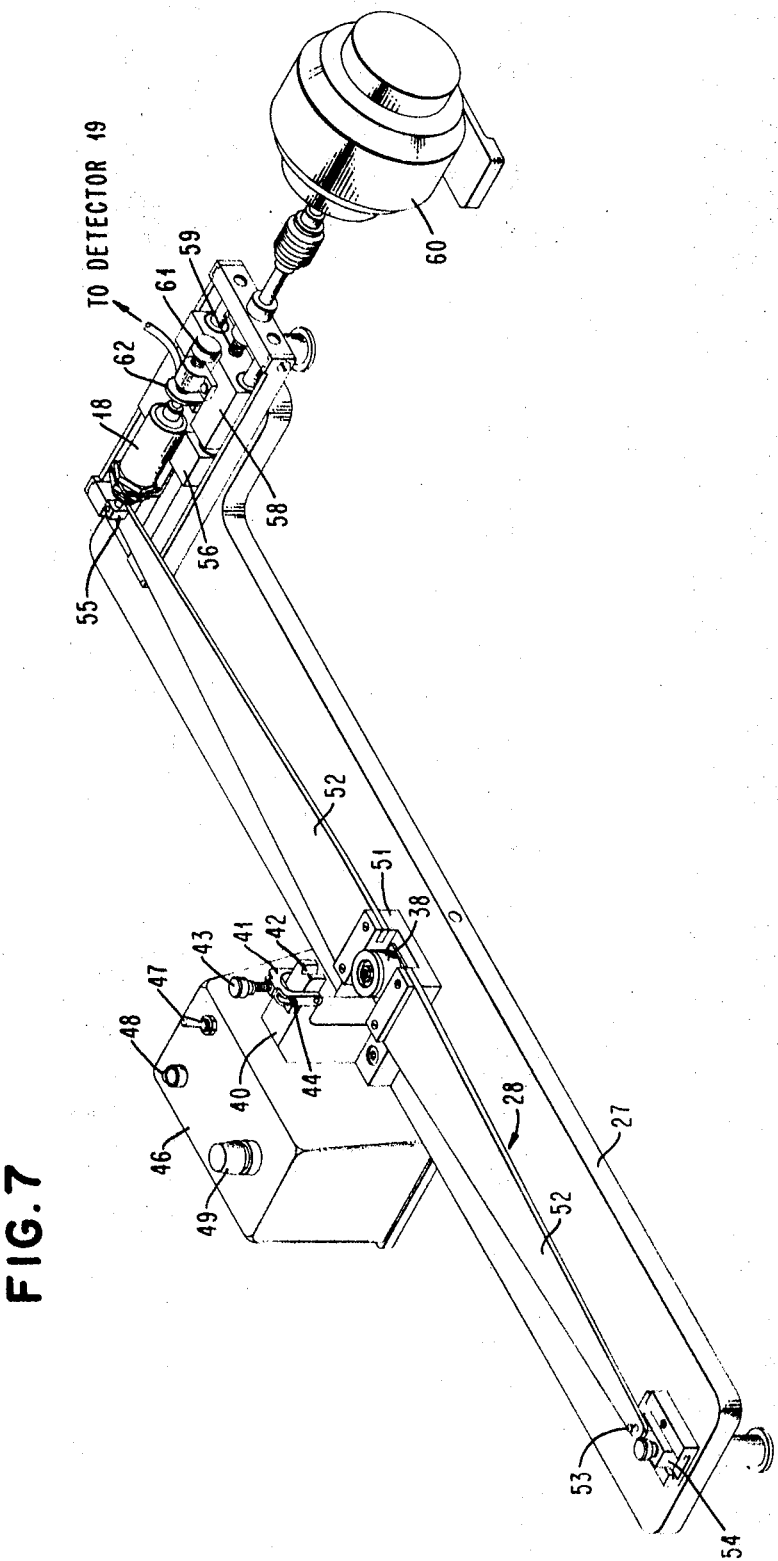
FIG. 7 is a perspective view of one form of apparatus for carrying out the invention.

Referring now to the drawings, a semiconductor device 10 has a silicon chip 11 mounted on a ceramic substrate 12. A plurality of lands 13 on substrate 12 have outer ends connected to some other lands or to some pins 14 (FIG. 9) by means of which the device 10 is connected to other circuitry. The inner ends of lands 13 terminate beneath chip 11 and are connected to pads 16, on chip 11, by solder joints 15.

Each joint 15 and resultant connection are made by a method similar to the method disclosed in U.S. Pat. 3,429,040—Miller. In accordance with the method, solder balls are first formed on chip 11. The solder is prevented from flowing on the chip by the ball limiting metallurgy of pads 16. The chip with balls is then positioned on presoldered lands 13 and heated so that the solder balls melt. When the solder balls become molten, their surface tension supports chip 11 at a distance above substrate 12 and, at the same time, the collective forces of the surface tension of all of the balls, correct any misalignment in the chip. Subsequently, when the solder cools, joints 15 become formed. The joints provide the mechanical and electrical connection between substrate 12, lands 13 and chip 11. Joints of this nature are known as controlled collapse joints. The actual shape of each joint 15 is dependent upon the diameter of pad 16, the shape of the lands 13, the amount of solder in the joint, and whether any standoff provision has been made. If all of the joints are of substantially the same size, and if no standoff is provided, the shape of joint 15 approaches that shown in FIG. 2 which is that of a spherical segment. If a standoff is provided, then the shape of joint 15 may be similar to that of an hour glass. In any event, the joint has a circular longitudinal cross section.

When device 1 is subjected to a temperature change, chip 11 and substrate 12 expand or contract at different rates due to their different thermal expansivity. As the silicon chip 11 has the lower coefficient of thermal expansion, it expands to a lesser extent than substrate 12. Because of the fact that substrate 12 and chip 11 also are much more rigid or stronger than solder 15, any displacement due to the thermal stresses between elements 11 and 12 is taken up within the solder joint 15. That is, the solder joint 15 is considered to more compliant than either chip 11 or substrate 12. Because chip 11 expands in all directions relative to substrate 12, due to a temperature increase, the resultant forces due to all of joints 15 acting on chip 11 produce a neutral point N in the chip. The thermal displacement X1 of each joint 15 is proportional to the distance $d$ from neutral point N, to the difference in thermal expansivity between the silicon chip and ceramic substrate (the thermal mismatch), and to the temperature change of the system from a neutral point of no stress. When all of the joints 15 are identical and if they are more or less uniformly spaced around the periphery of the chip, the neutral point N is at the geometric center of the chip.

In machine operation, as the temperature of device 10 increases, due to the machine being turned on, the unequal expansion between the chip 11 and substrate 12 results in a shear displacement between the top and bottom of each joint. This displacement is removed and reapplied each time the machine is turned on and off. If the imposed stress or strain is beyond the critical level, repeated cycling eventually causes mechanical rupture of the joints and electrical failure of the device. Those joints located the furthest from neutral point N, receive the greatest stresses and hence fail first.

In accordance with the method of the invention, we have found that a torque test sufficiently simulates thermal stresses so as to provide a relatively accurate measurement of the resistance to thermal cyclic fatigue of the semiconductor device being tested. In accordance with the torque test, chip 11 is rotated relative to substrate 10 about an axis of rotation that passes through the neutral point N of the chip. As such rotation occurs, the amount of torque and the degree of rotation are both measured. Thus, the test is similar to the thermal cycle or to thermal stresses on the device in that each joint 15 is placed in shear and the strain on each joint is proportional to its distance from the neutral point. The difference between the torque test and the thermal cycle or thermal displacement is that with the thermal displacement, the actual displacement X1 is in alignment with the direction of location of joint 15 from neutral point N, whereas within the torque test, as shown in FIG. 4, the shear displacement X2 is at right angles to the direction of the thermal displacement. However, even though the displacements are mutually perpendicular, the radial symmetry of joint 15 justifies the correspondence between the thermal and torque stresses.

In accordance with the method of the invention, the measurement may be plotted, as shown in FIG. 5, to provide a graph of the relationship between the torque T required to produce a given angle of rotation $\phi$ from the starting position. As the torque is applied, it increases to a maximum point $Tm$ corresponding to a degree of twist $\phi m$. From this point on, the torque decreases as the angle increases. This decrease is due to the progressive failure of the joints until the chip 11 is eventually ruptured, torn or twisted from substrate 12. The angle $\phi m$ at which the maximum torque occurs is indicative of the expected thermal fatigue life of the device. A typical range of $\phi m$'s is $1°-3°$.

The graph shown in FIG. 5 may be obtained from a recording system such as that shown in FIG. 6. In such system, a transducer 18 provides an output proportional to the torque applied to the test specimen which output is fed to a detector 19. The detector is in turn connected to provide an output to a pen drive 20 which appropriately drives a pen across a piece of graph paper 21. The graph paper is fed from a supply roll 22 to a take-up reel 23 driven by suitable motor 24 at a constant rate so that the X axis of the graph is proportional to the degree of rotation whereas the Y axis of the graph is proportional to the torque. The transducer, detector and pen drive are conventional and any suitable measuring system may be used.

FIGS. 7–9 show the apparatus of the invention. A base 27 carries a low friction bearing 30 that supports a shaft 29 upon which is mounted an arm 28, whereby the arm is supported for rotation in a horizontal plane. As shown more clearly in FIG. 9, in order to test the arm or semiconductor device, a rod 32 is adhesively joined to or cemented on chip 11 whereby the axis of the arm passes through the neutral point of chip 11. Device 10 is mounted in a vise 33 whereby substrate 12 is clamped between fixed and movable jaws 34 and 35. A screw 36 actuates jaw 35 so as to clamp device 10 in the vise. Vise 33 is of a magnetic material. Mounted on arm 28 in line with the axis of rotation is an electromagnet 38. During the test, the electromagnet 38 clamps or connects vise 33 to arm 28 whereby the substrate 12 can be rotated relative to chip 11.

In order to restrain chip 11 against rotation, the apparatus includes an overhang 40 mounted on base 27. The upper end of overhang 40 is spaced above electromagnet 38 and includes a notch 42 adapted to receive rod 32, whereby the axis of rod 32 is aligned with the axis of rotation of arm 28. A U-shaped clamp 41 is mounted on overhang 40 and carries a screw 43 and a bar 44. The clamp is movable between the disengaged position of FIG. 7 to a horizontal operative position shown in FIG. 8, whereby rod 32, upon tightening screw 43, is clamped in notch 42 and held against rotation.

Electromagnet 38 is electrically connected to a source of power in housing 46. A switch 47, light 48 and fuse 49 are contained in the circuits of the electromagnet to respectively control its energization, show that the electromagnet is actuated, and limit the amount of current flowing through the electromagnet.

The upper surface of electromagnet 38 supports vise 33 slightly above arm 28. Arm 28 comprises a U-shaped center portion 51 supporting two radial tapered blades 52. The outer ends of blades 52 carry pins 53. The blades 52 counteract or counterbalance each other, as do pins 53, so that arm 28 is balanced. Pin 53 on the left end of arm 28, in FIG. 7, is engageable with a slidable lock bar 54 to prevent rotation of arm 28. The lock bar is movable from the operative position shown in FIG. 7, to the inoperative position of FIG. 8, whereby arm 28 is free to rotate. Pin 53 on the other end of arm 28 is mounted in alignment with an actuator 55.

Actuator 55 is mounted on the end of transducer 18 which, in turn, is mounted upon a slide block 56. This block is mounted for sliding movement along two bars 57. Also mounted on bars 57 for sliding movement is a second slide block 58 that is connected to a lead screw 59 driven by a reversible constant speed selectively actuated motor 60. A bracket 62 is mounted on slide block 66 and is connected to the end of a screw 61 mounted on block 58. Screw 61 provides the connection between the two blocks whereby when block 58 is driven by lead screw 59, block 56 is also driven therewith. Screw 61 may also be used to manually drive or rotate arm 28. During the test, screw 61 is used to initially place actuator 55 in engagement with the associated pin 53 and thereafter, the motor 60 is actuated to cause the arm to be rotated until rupture occurs. As arm 28 is rotated, the reactive force of pin 53 bearing against actuator 55 actuates transducer 18 so as to provide an electrical output, which as previously indicated, is fed to detector 19 and provides a signal proportional to the torque.

It is to be noted that the direction of movement of actuator 55 is linear and is at right angles to arm 28, when the arm is in its reference position shown in FIG. 7. While such linear movement would introduce substantial error, if not compensated for, when arm 28 is rotated through a large angle, it has been found that chips 11 are ruptured or severed when the arm 28 is rotated through only a few degrees so that the amount of error introduced as a result of the linear movement being applied, is relatively small. Quite obviously, if such a factor became serious, then some other means for rotating arm 28 could be used, which other means might, for example, involve merely driving shaft 29.

In order to perform a test, arm 32 is first connected to chip 11 and device 10 is mounted in vise 33. Arm 28 is locked by bar 54 in the reference position and, while electromagnet 38 is deactuated, the vise 33 is placed thereon. The vise is moved horizontally until pin or rod 32 is firmly seated in notch 42. Next, clamp 41 is actuated to clamp rod 32 in overhang 40 and hold chip 11 against rotation. Electromagnet 38 is then energized. Next, bar 54 is released. Then, screw 61 is adjusted to bring actuator 55 into engagement with pin 53. At this point, both motor 60 which drives lead screw 59 and motor 24 which drives the recorder are actuated. Both are continued in operation until chip 11 is severed from device 10. During the course of such movement, the reactive force tending to separate chip 11 from device 10 is transmitted through arm 28 to the actuator 55 so as to activate transducer 18 and provide an output proportional to the torque applied to the chip. As both motors 60 and 24 are driven at constant speed, the time base of moving the paper 21 past the pen is proportional to the angle to which arm 28 has been rotated. Thus, it is proportional to the angle $\phi$ to which the chip has been twisted relative to the base.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of determining the expected thermal fatigue life of a semiconductor device of the type having a semiconductor chip mounted on a substrate by a plurality of solder columns spaced apart whereby a temperature change subjects said columns to thermal stresses and displaces said columns by amounts proportional to their repective distances from a thermal neutral point within said chip comprising the steps of:

rotating the chip relative to the substrate about an axis of rotation that passes through said located neutral point whereby each column is placed in shear and displaced by an amount proportional to its distance from such point;

and simultaneously measuring the amount of torque required to produce the relative rotation as a function of the angle through which said relative rotation occurs to determine the degree of twist at which the maximum torque occurs whereby the expected thermal life of the device can be predicted.

References Cited

UNITED STATES PATENTS

| 3,429,040 | 2/1969 | Miller | 29—626 |
| 2,632,958 | 5/1970 | De Masters | 33—215 |
| 3,212,326 | 10/1965 | Holt et al. | 73—99 |

FOREIGN PATENTS

| 164,692 | 1964 | U.S.S.R. | 42 K—34/01 |

OTHER REFERENCES

Machine Tests Strength of Soldered Joints, Paul H. Fahle, American Machinist, Sept. 3, 1941, pp. 856–857.

Torsional Shear of Adhesive Joints, H. Foulkes, Metals and Materials, vol. 4, No. 1. Torsion Test for Spot Welds, Bias Weld Metal Properties, September 1949, pp. 302–5.

RICHARD C. QUEISSER, Primary Examiner

J. WHALEN, Assistant Examiner

U.S. Cl. X.R.

73—99